(No Model.)

H. C. HERR.
EGG CARRIER.

No. 301,496. Patented July 8, 1884.

Witnesses.
J. M. Caldwell
J. Sangster

Inventor.
Henry C. Herr
By James Sangster
Atty.

UNITED STATES PATENT OFFICE.

HENRY C. HERR, OF WILLIAMSVILLE, NEW YORK.

EGG-CARRIER.

SPECIFICATION forming part of Letters Patent No. 301,496, dated July 8, 1884.

Application filed April 19, 1884. (No model.)

*To all whom it may concern:*

Be it known that I, HENRY C. HERR, a citizen of the United States, residing in Williamsville, in the county of Erie and State of New York, have invented certain new and useful Improvements in Egg-Carriers, of which the following is a specification.

The object of this invention is to provide the means for packing eggs for transportation; and it consists of a paper egg-carrier constructed of card-board formed into corrugations, and having a series of longitudinal strips of card passing through the corrugations and secured to the same, so as to leave a series of openings or recesses, each adapted to receive and retain in position a portion of an egg, the construction being such that a series of such egg-carriers are arranged in a package in layers one above the other, and the eggs are secured so that a portion rests in the one under it and the remaining portion in the one above it, as will be fully and clearly hereinafter shown by reference to the accompanying drawings, in which—

Figure 1:
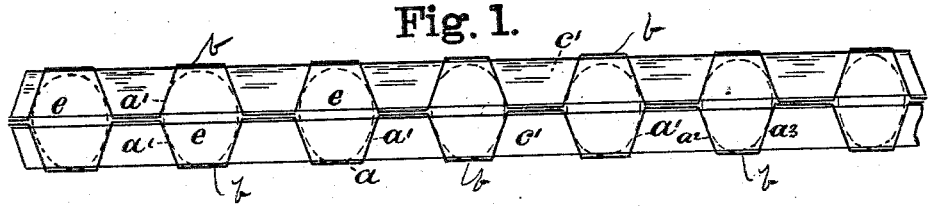
Figure 2:
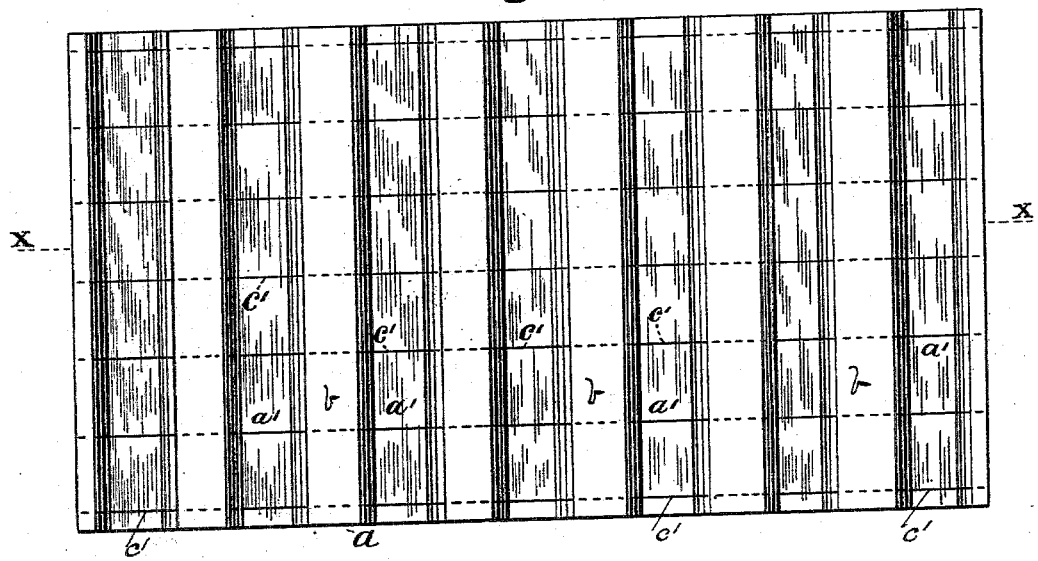
Figure 3:
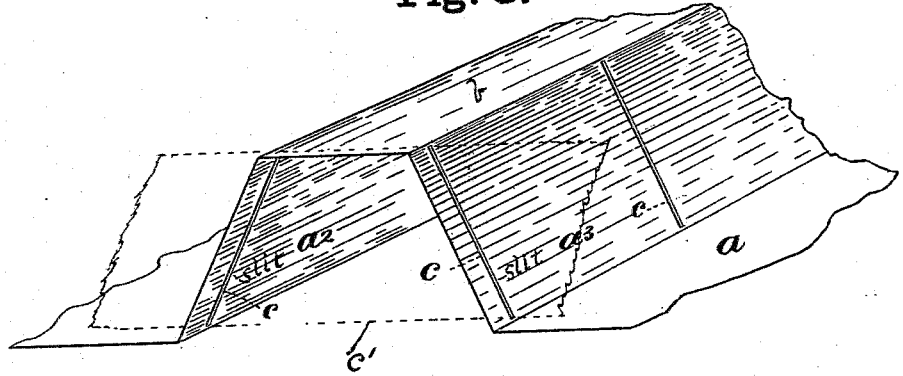

Figure 1 is a vertical longitudinal section through line X X, Fig. 2, showing two of the carriers, one resting on the other. Fig. 2 is a plan view showing one side of the carrier, and Fig. 3 is an enlarged perspective view of a portion of a carrier.

The paper $a$ is made into corrugations $a'$. These corrugations are formed, as shown, with the inclined sides $a^2$ $a^3$. Through each of the sides of the corrugations is a series of slits or narrow openings, $c$, through which are passed the narrow strips $c'$, which may be secured in place by paste, or in any well-known way. This construction leaves the cells or openings $e$, into which the eggs are placed. In packing the eggs for transportation, a case or box is used, one of the carriers is laid in the bottom of the box and filled with eggs, then another is laid over them and filled with eggs, which operation is continued until the case is filled.

The cells are made just large enough to receive and hold the eggs firmly in place, so that they will not shake or jar. In this way eggs may be transported any distance without danger of breaking. The cells, being just large enough to receive the smaller-sized eggs, and being elastic, will give enough to receive the large sizes.

I claim as my invention—

An egg-carrier consisting of the corrugated sheet $a$, provided with the slits $c$, in combination with the narrow strips or partitions $c'$, thereby forming the cells or openings, substantially as and for the purposes described.

H. C. HERR.

Witnesses:
J. M. CALDWELL,
JAMES SANGSTER.